United States Patent
Tran et al.

(10) Patent No.: US 12,545,702 B2
(45) Date of Patent: Feb. 10, 2026

(54) METHODS FOR REMOVING UNDESIRED COMPONENTS DURING MULTISTAGE CHROMATOGRAPHIC PROCESSES

(71) Applicant: Regeneron Pharmaceuticals, Inc., Tarrytown, NY (US)

(72) Inventors: Travis Tran, Tarrytown, NY (US); Andrew Tustian, Tarrytown, NY (US); Mark Chiboroski, Tarrytown, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 1022 days.

(21) Appl. No.: 17/618,061

(22) PCT Filed: Jun. 12, 2020

(86) PCT No.: PCT/US2020/037433
§ 371 (c)(1),
(2) Date: Dec. 10, 2021

(87) PCT Pub. No.: WO2020/252260
PCT Pub. Date: Dec. 17, 2020

(65) Prior Publication Data
US 2022/0306686 A1    Sep. 29, 2022

Related U.S. Application Data

(60) Provisional application No. 62/860,980, filed on Jun. 13, 2019.

(51) Int. Cl.
| C07K 1/22 | (2006.01) |
| B01D 15/18 | (2006.01) |
| B01D 15/20 | (2006.01) |
| B01D 15/36 | (2006.01) |
| B01D 15/38 | (2006.01) |
| B01D 15/42 | (2006.01) |
| C07K 1/18 | (2006.01) |

(52) U.S. Cl.
CPC ............ C07K 1/22 (2013.01); B01D 15/1871 (2013.01); B01D 15/203 (2013.01); B01D 15/363 (2013.01); B01D 15/3809 (2013.01); B01D 15/424 (2013.01); C07K 1/18 (2013.01); C07K 2317/31 (2013.01)

(58) Field of Classification Search
CPC ........ C07K 1/22; C07K 1/18; C07K 2317/31; C07K 1/16; C07K 16/00; B01D 15/1871; B01D 15/203; B01D 15/363; B01D 15/3809; B01D 15/424
See application file for complete search history.

(56) References Cited

U.S. PATENT DOCUMENTS

| 10,626,142 B2* | 4/2020 | Tustian ................ C07K 16/065 |
| 12,152,056 B2* | 11/2024 | Perrone ............. B01D 15/3809 |
| 2016/0024147 A1* | 1/2016 | Tustian ................ C07K 16/065 |
| | | 530/413 |

FOREIGN PATENT DOCUMENTS

| EP | 0177882 A2 | 4/1986 |
| WO | 1993/019085 A1 | 9/1993 |
| WO | 2005/000898 A2 | 1/2005 |
| WO | 09/029847 A1 | 3/2009 |
| WO | 2010/151792 A1 | 12/2010 |
| WO | WO-2015035180 A1 * | 3/2015 ........... B01D 15/203 |
| WO | 2016/018740 A2 | 2/2016 |
| WO | 17/134440 A2 | 8/2017 |

OTHER PUBLICATIONS

Milne, J.J. (2017). Scale-Up of Protein Purification: Downstream Processing Issues. In: Walls, D., Loughran, S. (eds) Protein Chromatography. Methods in Molecular Biology, vol. 1485. Humana Press, New York, NY. https://doi.org/10.1007/978-1-4939-6412-3_5 (Year: 2017).*
Brinkmann, et. al. The making of bispecific antibodies. MAbs. Feb./Mar. 2017;9(2):182-212. doi: 10.1080/19420862.2016.1268307. PMID: 28071970; PMCID: PMC5297537 (Year: 2017).*
Van der Kant R, et al. Prediction and Reduction of the Aggregation of Monoclonal Antibodies. J Mol Biol. Apr. 21, 2017;429(8):1244-1261. doi: 10.1016/j.jmb.2017.03.014. Epub Mar. 18, 2017. PMID: 28322916; PMCID: PMC539760 (Year: 2017).*
WIPO Application No. PCT/US2020/037433, PCT International Search Report and Written Opinion of the International Searching Authority mailed Sep. 11, 2020.
Shukla et al., "Protein aggregation kinetics during Protein A chromatography. Case study for an Fc fusion protein," J Chromatogr A, Nov. 9, 2007; Abstract.

(Continued)

*Primary Examiner* — Anand U Desai
*Assistant Examiner* — Kathleen Cunningchen
(74) *Attorney, Agent, or Firm* — Schwabe, Williamson & Wyatt PC; David Mellman (57) ABSTRACT

High resolution affinity chromatography combining affinity resolving and affinity capture processes using a single chromatography matrix results in improved resolution between closely related molecular species and significantly enhances overall product yield for large scale commercial production of heterodimeric proteins such as bispecific antibodies. Moreover, tankage and equipment requirements are reduced via the ability to reduce salt concentration, while increasing product purity and concentration, without the need for dilution, ultrafiltration or diafiltration.

34 Claims, 1 Drawing Sheet

(56) References Cited

OTHER PUBLICATIONS

Tustian et al., "Development of a Novel Affinity Chromatography Resin for Platform Purification of Bispecific Antibodies with Modified Protein A Binding Avidity," The Authors Biotechnology Progress published by Wiley Periodicals, Inc. on behalf of American Institute of Chemical Engineers, vol. 34 (No. 3): 650-658, (2018). [DOI 10.1002/btpr.2622].

* cited by examiner

METHODS FOR REMOVING UNDESIRED COMPONENTS DURING MULTISTAGE CHROMATOGRAPHIC PROCESSES

CROSS-REFERENCE TO RELATED APPLICATIONS

This Application is a US National Stage Application under 35 USC § 371 of PCT/US2020/037433, filed Jun. 12, 2020, which claims the benefit under 35 USC § 119(e) of U.S. Provisional Patent Application No. 62/860,980, filed Jun. 13, 2019, each of which is herein incorporated by reference in its entirety.

FIELD OF THE INVENTION

The present invention relates to methods for removing undesirable components from a chromatographic process stream for the purification of protein products, e.g, the purification of heterodimeric proteins from a complex mixture of proteins via affinity chromatography. Specifically, the methods include isolating a heterodimer (including a bispecific antibody) from a complex mixture of monomers and homodimers via affinity chromatography (including Protein A chromatography) in which the purified heterodimer is collected in a low salt and conductivity eluate to facilitate further downstream processing of the heterodimeric protein.

BACKGROUND

The purification of protein products often requires a multi-stage process utilizing various chromatography steps to remove impurities such as host cell proteins, DNA and undesired species of the protein product. In many cases, components of the chromatography columns or buffers form part of the eluate emanating from each chromatography step, but these components may be undesirable in downstream process steps. For example, high concentrations of salt may be used to facilitate separation of a protein product from impurities or undesired species of the molecule, but the salt may be incompatible with downstream process steps such as additional chromatography steps or viral inactivation.

Multiple bispecific antibody formats have been proposed and are currently under development. One such format is based upon a standard fully human IgG antibody having an improved pharmacokinetic profile and minimal immunogenicity (see U.S. Pat. No. 8,586,713, which is incorporated herein in its entirety). A single common light chain and two distinct heavy chains combine to form the bispecific antibody. One of the heavy chains contains a substituted Fc sequence (hereinafter "Fc*") that reduces or eliminates binding of the Fc* to Protein A. For example, one such Fc* sequence contains H435R/Y436F (by EU numbering system; H95R/Y96F by IMGT exon numbering system) substitutions in the CH3 domain. Co-expression of the two heavy chains and the common light chain, results in three products: two of which are homodimeric for the heavy chains and one of which is the desired heterodimeric bispecific product. The Fc* sequence allows selective purification of the FcFc* bispecific product on commercially available affinity columns, due to intermediate binding affinity for Protein A compared to the high avidity FcFc heavy chain homodimer, or the weakly binding Fc*Fc* homodimer.

To achieve commercial scale purification of the bispecific heterodimer, good resolution between the FcFc homodimer, the Fc*Fc heterodimer, and the Fc*Fc* homodimer is required, along with considerations such as the volume of material to be processed, and the costs and space requirements for the equipment and materials used in the purification process.

BRIEF SUMMARY OF THE INVENTION

In one or more aspects or embodiments thereof, the invention is directed to methods of removing a component from a chromatographic eluate, comprising: (a) performing a first chromatography step in which the component is present in a first buffer applied to a chromatographic column; (b) collecting an intermediate eluate from the first chromatography step, wherein the intermediate eluate contains a protein product and the component; (c) reapplying the intermediate eluate to the chromatographic column, and eluting the protein product with a second buffer containing the component at a concentration lower than that of the intermediate eluate; (d) collecting the chromatographic eluate from step (c), wherein the component is present in the chromatographic eluate at a concentration lower than that of the intermediate eluate; and (e) applying the chromatographic eluate to a subsequent process step. In some embodiments, the component is absent from the second buffer.

In some embodiments, the component is a salt. In some cases, the concentration of the salt in the intermediate eluate is greater than 50 mM. In some cases, the concentration of the salt in the intermediate eluate is ≥100 mM, ≥250 mM, ≥500 mM, ≥600 mM, ≥700 mM, ≥800 mM, ≥900 mM, or ≥1000 mM. In some cases, the concentration of salt in the intermediate eluate is 500 mM±50 mM.

In some embodiments, the first chromatography step is selected from affinity chromatography or ion exchange chromatography. In some embodiments, the subsequent process step is a second chromatography step. In some cases, the subsequent process step is selected from affinity chromatography, ion exchange chromatography, mixed-mode chromatography, hydrophobic interaction chromatography, or viral inactivation.

In some embodiments, the protein product is an antibody (e.g., a bispecific antibody).

In one or more aspects and embodiments thereof, the invention is directed to methods of purifying a heterodimeric protein, such as for example a bispecific antibody, from a complex mixture of proteins that include homodimers and heterodimers, by employing an affinity capture and elution process.

In one aspect, the present invention provides a method of purifying a heterodimeric protein, comprising: (a) introducing a mixture of a heterodimeric protein and impurities to an affinity matrix containing a protein-binding ligand, wherein the heterodimeric protein comprises first and second polypeptides with differing affinity for the protein-binding ligand, and wherein at least one impurity binds the protein-binding ligand and at least one impurity does not bind the protein-binding ligand; (b) washing the affinity matrix with a first wash buffer comprising a salt concentration greater than 200 mM and a first pH of from 5 to 9 to remove impurities; (c) eluting and collecting the heterodimeric protein from the affinity matrix in a first elution buffer comprising a salt at a concentration greater than 200 mM and a second pH of from 4 to 5 to obtain a purified heterodimeric protein in a first eluate; (d) washing the affinity matrix with a second wash buffer comprising a third pH of less than 4 to remove impurities; (e) equilibrating the affinity matrix to a fourth pH of from 5 to 9; (f) neutralizing the first eluate to a pH of 5 to 9, then reapplying the first eluate to the affinity matrix; (g) washing the affinity matrix with a third wash buffer comprising less than 100 mM salt; and (h) eluting and collecting the purified heterodimeric protein in a second eluate, wherein the second eluate comprises less than 100 mM of the salt. In various embodiments of the method, the purified heterodimeric protein is eluted and collected in the second eluate via the third wash buffer. In some embodiments of the method, the third wash buffer comprises less than 50 mM salt.

In some embodiments, the impurities comprise homodimeric species of the first and second polypeptides.

In some embodiments, the protein-binding ligand is Protein A, and the affinity matrix comprises the Protein A ligand affixed to a substrate. In some cases, the Protein A ligand is an engineered Protein A comprising a Z-domain tetramer, an engineered Protein A comprising a Y-domain tetramer, or an engineered Protein A that lacks D and E domains. In one embodiment, the Protein A ligand comprises a Z-domain tetramer.

In some embodiments, the protein-binding ligand is Protein G, and the affinity matrix comprises the Protein G ligand affixed to a substrate.

In various embodiments of the method, the substrate is a particle and the affinity matrix comprises a multiplicity of the particles of a mean diameter from 25 µm to 100 µm. In some embodiments, the particles comprise a mean diameter of from 40 µm to 60 um. In some embodiments, the particles comprise a mean diameter of from 45 µm to 55 um. In some embodiments, the particles comprise a mean diameter of about 50 µm. In some cases, the particles comprise pores having a mean diameter of about 1100 Å.

In various embodiments, the substrate comprises any one or more of agarose, poly(styrene divinylbenzene), polymethacrylate, cellulose, controlled pore glass, and spherical silica.

In some embodiments of the method, the first elution buffer comprises a salt at a concentration of greater than 250 mM. In some cases, the salt concentration is greater than 300 mM or greater than 400 mM. In some embodiments, the salt concentration is about 500 mM.

In various embodiments of the method, the salt is selected from a salt containing (i) $Cl^-$, $Br^-$, $I^-$, $NO_3^-$, $N(CH_3)_4^+$, $NH_4^+$, $Cs^+$, $Rb^+$, $K^+$, $Na^+$, $H^+$, $Ca^{2+}$, $Mg^{2+}$, $Al^{3+}$; or (ii) $CaCl_2$, $MgCl_2$ or $NaCl$.

In various embodiments of the method, the second eluate comprises less than 50 mM of the salt. In some embodiments, the second eluate comprises less than 10 mM of the salt.

In various embodiments of the method, the first polypeptide comprises a CH3 domain that is capable of binding to the protein-binding ligand and the second polypeptide comprises a CH3 domain that is not capable of binding to the protein-binding ligand. In some embodiments, the first polypeptide comprises a CH3 domain that is capable of binding to Protein A and the second polypeptide comprises a CH3 domain that is not capable of binding to Protein A. In some embodiments, the first polypeptide comprises a CH3 domain that is capable of binding to Protein G and the second polypeptide comprises a CH3 domain that is not capable of binding to Protein G. In various embodiments, the second polypeptide comprises a HY to RF substitution in its CH3 domain.

In various embodiments of the method, the first pH is from 6 to 8. In some embodiments, the second pH is from 4.0 to 4.25. In some cases, the second pH is 4.10±0.05. In some embodiments, the third pH is from 2.8 to 3.5. In some embodiments, the fourth pH is from 6 to 8.

In some embodiments, the method further includes an additional chromatography step or viral inactivation step following elution and collection of the purified heterodimeric protein in a low salt (e.g., less than 100 mM, less than 50 mM or less than 25 mM) eluate. In some cases, conductivity of the purified composition is reduced to <5.0 mS/cm. In some cases, conductivity of the purified composition is reduced to <2.0 mS/cm. In some embodiments, the additional chromatography step or viral inactivation step are performed under conditions with less than 100 mM salt. In some cases, the additional chromatography step includes ion exchange chromatography. In some embodiments, the ion exchange chromatography is anion exchange chromatography and is performed under conditions with less than 50 mM salt.

In various embodiments of the method, the heterodimeric protein is a bispecific antigen-binding protein. In some embodiments, the bispecific antigen-binding protein is a bispecific antibody.

In various embodiments, any of the features or components of embodiments discussed above or herein may be combined, and such combinations are encompassed within the scope of the present disclosure. Any specific value discussed above or herein may be combined with another related value discussed above or herein to recite a range with the values representing the upper and lower ends of the range, and such ranges are encompassed within the scope of the present disclosure.

DETAILED DESCRIPTION

Before the present invention is described, it is to be understood that this invention is not limited to particular methods and experimental conditions described, as such methods and conditions may vary. It is also to be understood that the terminology used herein is for describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. As used herein, the term "about," when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4, etc.).

Although any methods and materials similar or equivalent to those described herein can be used in the practice or testing of the present invention, the preferred methods and materials are now described. All patents, applications and non-patent publications mentioned in this specification are incorporated herein by reference in their entireties.

General

The present invention is predicated, at least in part, on the discovery that reapplication of a neutralized elute containing a purified heterodimeric protein (e.g., a bispecific antibody) to the same affinity matrix used to purify the protein can significantly enhance overall product yield and minimize the presence of high molecular weight species, while reducing costs and the footprint of the purification system for large-scale commercial manufacturing. Cost of materials and space considerations for large-scale manufacturing and purification of therapeutic bispecific antibodies are significant concerns. Reuse of chromatography columns for multiple processes both minimizes the cost of the column materials (e.g., chromatography medium or resin) as well as the space occupied by the equipment necessary to achieve a desired product. Purification of bispecific antibodies via affinity chromatography has been described previously, but these processes generally make use of two separate affinity columns (e.g., MabSelect SuRe™ and MabCapture A™) and rely on ultrafiltration/diafiltration, or salt tolerant multimodal resins to remove salts from the affinity chromatography process steps. The present inventors have discovered that by utilizing a single column for both affinity chromatography processing steps, overall product yield can be significantly improved (to an average of about 92%, compared to an average of about 77% when using two separate columns), and the salts used to achieve robust separation of the heterodimer from the homodimeric impurities can be removed without the need for ultrafiltration or diafiltration, thus reducing costs and space considerations, while providing a product stream for additional chromatography or other polishing steps without the need for expensive salt-tolerant materials.

Definitions

The term "antibody", as used herein, includes immunoglobulin molecules comprised of four polypeptide chains, two heavy (H) chains and two light (L) chains inter-connected by disulfide bonds. Each heavy chain comprises a heavy chain variable region (abbreviated herein as HCVR or VH) and a heavy chain constant region. The heavy chain constant region comprises three domains, CH1, CH2 and CH3. Each light chain comprises a light chain variable region (abbreviated herein as LCVR or VL) and a light chain constant region. The light chain constant region comprises one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4 (heavy chain CDRs may be abbreviated as HCDR1, HCDR2 and HCDR3; light chain CDRs may be abbreviated as LCDR1, LCDR2 and LCDR3. The term "high affinity" antibody refers to those antibodies having a binding affinity to their target of at least $10^{-9}$ M, at least $10^{-1}$ M; at least $10^{-11}$ M; or at least $10^{-12}$ M, as measured by surface plasmon resonance, e.g., BIACORE™ or solution-affinity ELISA.

The phrase "bispecific antibody" includes an antibody capable of selectively binding two or more epitopes. Bispecific antibodies generally comprise two different heavy chains, with each heavy chain specifically binding a different epitope—either on two different molecules (e.g., antigens) or on the same molecule (e.g., on the same antigen). If a bispecific antibody is capable of selectively binding two different epitopes (a first epitope and a second epitope), the affinity of the first heavy chain for the first epitope will generally be at least one to two or three or four orders of magnitude lower than the affinity of the first heavy chain for the second epitope, and vice versa. The epitopes recognized by the bispecific antibody can be on the same or a different target (e.g., on the same or a different protein). Bispecific antibodies can be made, for example, by combining heavy chains that recognize different epitopes of the same antigen. For example, nucleic acid sequences encoding heavy chain variable sequences that recognize different epitopes of the same antigen can be fused to nucleic acid sequences encoding different heavy chain constant regions, and such sequences can be expressed in a cell that expresses an immunoglobulin light chain. A typical bispecific antibody has two heavy chains each having three heavy chain CDRs, followed by (N-terminal to C-terminal) a CH1 domain, a hinge, a CH2 domain, and a CH3 domain, and an immunoglobulin light chain that either does not confer antigen-binding specificity but that can associate with each heavy chain, or that can associate with each heavy chain and that can bind one or more of the epitopes bound by the heavy chain antigen-binding regions, or that can associate with each heavy chain and enable binding or one or both of the heavy chains to one or both epitopes.

In various embodiments of the methods discussed herein, the heterodimeric proteins, bispecific antibodies, Fc-containing proteins, or the like, may be of isotype IgG. In some cases, the heterodimeric proteins, bispecific antibodies, Fc-containing proteins, or the like, are of isotype IgG1, IgG2, IgG3 or IgG4. In some cases, the heterodimeric proteins, bispecific antibodies, Fc-containing proteins, or the like are of isotype IgG1. In some cases, the heterodimeric proteins, bispecific antibodies, Fc-containing proteins, or the like, are of isotype IgG4. In various embodiments, the heterodimeric proteins, bispecific antibodies, Fc-containing proteins, or the like, are fully human.

The phrase "heavy chain," or "immunoglobulin heavy chain" includes an immunoglobulin heavy chain constant region sequence from any organism, and unless otherwise specified includes a heavy chain variable domain. Heavy chain variable domains include three heavy chain CDRs and four FR regions, unless otherwise specified. Fragments of heavy chains include CDRs, CDRs and FRs, and combinations thereof. A typical heavy chain has, following the variable domain (from N-terminal to C-terminal), a CH1 domain, a hinge, a CH2 domain, and a CH3 domain. A functional fragment of a heavy chain includes a fragment that is capable of specifically recognizing an antigen (e.g., recognizing the antigen with a KD in the micromolar, nanomolar, or picomolar range), that is capable of expressing and secreting from a cell, and that comprises at least one CDR.

The phrase "light chain" includes an immunoglobulin light chain constant region sequence from any organism, and unless otherwise specified includes human kappa and lambda light chains. Light chain variable (VL) domains typically include three light chain CDRs and four framework (FR) regions, unless otherwise specified. Generally, a full-length light chain includes, from amino terminus to carboxyl terminus, a VL domain that includes FR1-CDR1-FR2-CDR2-FR3-CDR3-FR4, and a light chain constant domain. Light chains that can be used with this invention include those, e.g., that do not selectively bind either the first or second antigen selectively bound by the antigen-binding protein. Suitable light chains include those that can be identified by screening for the most commonly employed light chains in existing antibody libraries (wet libraries or in silico), where the light chains do not substantially interfere with the affinity and/or selectivity of the antigen-binding domains of the antigen-binding proteins. Suitable light chains include those that can bind one or both epitopes that are bound by the antigen-binding regions of the antigen-binding protein.

The phrase "variable domain" includes an amino acid sequence of an immunoglobulin light or heavy chain (modified as desired) that comprises the following amino acid regions, in sequence from N-terminal to C-terminal (unless otherwise indicated): FR1, CDR1, FR2, CDR2, FR3, CDR3, FR4. A "variable domain" includes an amino acid sequence capable of folding into a canonical domain (VH or VL) having a dual beta sheet structure wherein the beta sheets are connected by a disulfide bond between a residue of a first beta sheet and a second beta sheet.

The phrase "complementarity determining region," or the term "CDR," includes an amino acid sequence encoded by a nucleic acid sequence of an organism's immunoglobulin genes that normally (i.e., in a wild-type animal) appears between two framework regions in a variable region of a light or a heavy chain of an immunoglobulin molecule (e.g., an antibody or a T cell receptor). A CDR can be encoded by, for example, a germline sequence or a rearranged or unrearranged sequence, and, for example, by a naive or a mature B cell or a T cell. In some circumstances (e.g., for a CDR3), CDRs can be encoded by two or more sequences (e.g., germline sequences) that are not contiguous (e.g., in an unrearranged nucleic acid sequence) but are contiguous in a B cell nucleic acid sequence, e.g., as the result of splicing or connecting the sequences (e.g., V-D-J recombination to form a heavy chain CDR3).

The phrase "Fc-containing protein" includes antibodies, bispecific antibodies, heterodimeric proteins and immunoadhesins, and other binding proteins that comprise at least a functional portion of an immunoglobulin CH2 and CH3 region. A "functional portion" refers to a CH2 and CH3 region that can bind a Fc receptor (e.g., an FcγR; or an FcRn, i.e., a neonatal Fc receptor), and/or that can participate in the activation of complement. If the CH2 and CH3 region contains deletions, substitutions, and/or insertions or other modifications that render it unable to bind any Fc receptor and also unable to activate complement, the CH2 and CH3 region is not functional.

Fc-containing proteins can comprise modifications in immunoglobulin domains, including where the modifications affect one or more effector function of the binding protein (e.g., modifications that affect FcγR binding, FcRn binding and thus half-life, and/or CDC activity). Such modifications include, but are not limited to, the following modifications and combinations thereof, with reference to EU numbering of an immunoglobulin constant region: 238, 239, 248, 249, 250, 252, 254, 255, 256, 258, 265, 267, 268, 269, 270, 272, 276, 278, 280, 283, 285, 286, 289, 290, 292, 293, 294, 295, 296, 297, 298, 301, 303, 305, 307, 308, 309, 311, 312, 315, 318, 320, 322, 324, 326, 327, 328, 329, 330, 331, 332, 333, 334, 335, 337, 338, 339, 340, 342, 344, 356, 358, 359, 360, 361, 362, 373, 375, 376, 378, 380, 382, 383, 384, 386, 388, 389, 398, 414, 416, 419, 428, 430, 433, 434, 435, 437, 438, and 439.

For example, and not by way of limitation, the binding protein is an Fc-containing protein and exhibits enhanced serum half-life (as compared with the same Fc-containing protein without the recited modification(s)) and have a modification at position 250 (e.g., E or Q); 250 and 428 (e.g., L or F); 252 (e.g., L/Y/F/W or T), 254 (e.g., S or T), and 256 (e.g., S/R/Q/E/D or T); or a modification at 428 and/or 433 (e.g., L/R/SI/P/Q or K) and/or 434 (e.g., H/F or Y); or a modification at 250 and/or 428; or a modification at 307 or 308 (e.g., 308F, V308F), and 434. In another example, the modification can comprise a 428L (e.g., M428L) and 434S (e.g., N434S) modification; a 428L, 259I (e.g., V259I), and a 308F (e.g., V308F) modification; a 433K (e.g., H433K) and a 434 (e.g., 434Y) modification; a 252, 254, and 256 (e.g., 252Y, 254T, and 256E) modification; a 250Q and 428L modification (e.g., T250Q and M428L); a 307 and/or 308 modification (e.g., 308F or 308P).

The term "star substitution", "Fe", and "HC*" includes any molecule, immunoglobulin heavy chain, Fc fragment, Fc-containing molecule, heterodimeric protein and the like which contain a sequence within the CH3 domain that abrogates binding to Protein A. Specific modifications, such as H95R and Y96F, that can diminish or abrogate Protein A binding in the CH3 domain are discussed in U.S. Pat. No. 8,586,713. This dipeptide mutation is designated as the "star substitution".

The term "cell" includes any cell that is suitable for expressing a recombinant nucleic acid sequence. Cells include those of prokaryotes and eukaryotes (single-cell or multiple-cell), bacterial cells (e.g., strains of *E. coli, Bacillus* spp., *Streptomyces* spp., etc.), mycobacteria cells, fungal cells, yeast cells (e.g., *S. cerevisiae, S. pombe, P. pastoris, P. methanolica*, etc.), plant cells, insect cells (e.g., SF-9, SF-21, baculovirus-infected insect cells, *Trichoplusia ni*, etc.), non-human animal cells, human cells, or cell fusions such as, for example, hybridomas or quadromas. In some embodiments, the cell is a human, monkey, ape, hamster, rat, or mouse cell. In some embodiments, the cell is eukaryotic and is selected from the following cells: CHO (e.g., CHO K1, DXB-11 CHO, Veggie-CHO), COS (e.g., COS-7), retinal cell, Vero, CV1, kidney (e.g., HEK293, 293 EBNA, MSR 293, MDCK, HaK, BHK), HeLa, HepG2, WI38, MRC 5, Colo205, HB 8065, HL-60, (e.g., BHK21), Jurkat, Daudi, A431 (epidermal), CV-1, U937, 3T3, L cell, C127 cell, SP2/0, NS-0, MMT 060562, Sertoli cell, BRL 3A cell, HT1080 cell, myeloma cell, tumor cell, and a cell line derived from an aforementioned cell. In some embodiments, the cell comprises one or more viral genes, e.g. a retinal cell that expresses a viral gene (e.g., a PER.C6™ cell).

The phrase "mobile phase modifier" includes moieties that reduce the effect of, or disrupt, non-specific (i.e., non-affinity) ionic and other non-covalent interactions between proteins. "Mobile phase modifiers" include, for example, salts, ionic combinations of Group I and Group II metals with acetate, bicarbonate, carbonate, a halogen (e.g., chloride or fluoride), nitrate, phosphate, or sulfate. A non-limiting illustrative list of "mobile phase modifiers" includes beryllium, lithium, sodium, and potassium salts of acetate; sodium and potassium bicarbonates; lithium, sodium, potassium, and cesium carbonates; lithium, sodium, potassium, cesium, and magnesium chlorides; sodium and potassium fluorides; sodium, potassium, and calcium nitrates; sodium and potassium phosphates; and calcium and magnesium sulfates.

"Mobile phase modifiers" also include chaotropic agents, which weaken or otherwise interfere with non-covalent forces and increase entropy within biomolecular systems. Non-limiting examples of chaotropic agents include butanol, calcium chloride, ethanol, guanidinium chloride, lithium perchlorate, lithium acetate, magnesium chloride, phenol, propanol, sodium dodecyl sulfate, thiourea, and urea. Chaotropic agents include salts that affect the solubility of proteins. The more chaotropic anions include for example chloride, nitrate, bromide, chlorate, iodide, perchlorate, and thiocyanate. The more chaotropic cations include for example lithium, magnesium, calcium, and guanidinium.

"Mobile phase modifiers" include those moieties that affect ionic or other non-covalent interactions that, upon addition to a pH gradient or step, or upon equilibration of a Protein A support in a "mobile phase modifier" and application of a pH step or gradient, results in a broadening of pH unit distance between elution of a homodimeric IgG and a heterodimeric IgG (e.g., a wild-type human IgG and the same IgG but bearing one or more modifications of its CH3 domain as described herein). A suitable concentration of a "mobile phase modifier" can be determined by its concentration employing the same column, pH step or gradient, with increasing concentration of "mobile phase modifier" until a maximal pH distance is reached at a given pH step or pH gradient. "Mobile phase modifiers" may also include non-polar modifiers, including for example propylene glycol, ethylene glycol, and the like.

As used herein, "affinity chromatography" is a chromatographic method that makes use of the specific, reversible interactions between biomolecules rather than general properties of the biomolecule such as isoelectric point, hydrophobicity, or size, to effect chromatographic separation. "Protein A affinity chromatography" or "Protein A chromatography" refers to a specific affinity chromatographic method that makes use of the affinity of the IgG binding domains of Protein A for the Fc portion of an immunoglobulin molecule. This Fc portion comprises human or animal immunoglobulin constant domains CH2 and CH3 or immunoglobulin domains substantially similar to these. Protein A encompasses native protein from the cell wall of *Staphylococcus aureus*, Protein A produced by recombinant or synthetic methods, and variants that retain the ability to bind to an Fc region. In practice, Protein A chromatography involves using Protein A immobilized to a solid support. See Gagnon, Protein A Affinity Chromotography, Purification Tools for Monoclonal Antibodies, pp. 155-198, Validated Biosystems, 1996. Protein G and Protein L may also be used for affinity chromotography. The solid support is a non-aqueous matrix onto which Protein A adheres. Such supports include agarose, sepharose, glass, silica, polystyrene, nitrocellulose, charcoal, sand, cellulose and any other suitable material. Such materials are well known in the art. Any suitable method can be used to affix the second protein to the solid support. Methods for affixing proteins to suitable solid supports are well known in the art. See e.g. Ostrove, in Guide to Protein Purification, Methods in Enzymology, 182: 357-371, 1990. Such solid supports, with and without immobilized Protein A, are readily available from many commercial sources including such as Vector Laboratory (Burlingame, Calif.), Santa Cruz Biotechnology (Santa Cruz, Calif.), BioRad (Hercules, Calif.), Amersham Biosciences (part of GE Healthcare, Uppsala, Sweden), Pall (Port Washington, NY) and EMD-Millipore (Billerica, Mass.). Protein A immobilized to a pore glass matrix is commercially available as PROSEP®-A (Millipore). The solid phase may also be an agarose-based matrix. Protein A immobilized on an agarose matrix is commercially available as MABSELECT™ (Amersham Biosciences).

Affinity chromatography also includes media that can be used to selectively bind and thus purify antibodies, fragments of antibodies, or chimeric fusion proteins that contain immunoglobulin domains and/or sequences. Antibodies include IgG, IgA, IgM, IgY, IgD and IgE types. Antibodies also include single chain antibodies such as camelid antibodies, engineered camelid antibodies, single chain antibodies, single-domain antibodies, nanobodies, and the like. Antibody fragments include VH, VL, CL, CH sequences. Antibody fragments and fusion proteins containing antibody sequences include for example $F(ab')_3$, $F(ab')_2$, Fab, Fc, Fv, dsFv, $(scFv)_2$, scFv, scAb, minibody, diabody, triabody, tetrabody, Fc-fusion proteins, trap molecules, and the like (see Ayyar et al., Methods 56 (2012): 116-129). Such affinity chromatography media may contain ligands that selectively bind antibodies, their fragments, and fusion proteins contains those fragments. Such ligands include antibody binding proteins, bacterially derived receptors, antigens, lectins or anti-antibodies directed to the target molecule. the antibody requiring purification. For example, camelid-derived affinity ligands directed against any one or more of IgG-CH1, IgG-Fc, IgG-CH3, IgG1, LC-kappa, LC-lambda, IgG3/4, IgA, IgM, and the like may be used as affinity ligands (commercially available as CAPTURESELECT chromatography resins, Life Technologies, Inc., Carlsbad, Calif.)

Methods of Removing Undesirable Components from Purification Streams

Embodiments of methods of the present invention include methods of removing undesirable components from a process stream for the purification of protein products. The methods are intended to remove one or more components (e.g., a chemical component or salt) from an eluate produced from a chromatography step that may be detrimental to a downstream process step. In some embodiments, the method includes (a) performing a first chromatography step in which the component is present in a first buffer applied to a chromatographic column; (b) collecting an intermediate eluate from the first chromatography step, wherein the intermediate eluate contains a protein product and the component; (c) reapplying the intermediate eluate to the chromatographic column, and eluting the protein product with a second buffer containing the component at a concentration lower than that of the intermediate eluate; (d) collecting the chromatographic eluate from step (c), wherein the component is present in the chromatographic eluate at a concentration lower than that of the intermediate eluate; and (e) applying the chromatographic eluate to a subsequent process step. In some embodiments, the component is absent from the second buffer.

As discussed in greater detail below in connection with the methods for purifying heterodimeric proteins, in some embodiments the component is a salt. In some cases, the concentration of the salt in the intermediate eluate is greater than 50 mM. In some cases, the concentration of the salt in the intermediate eluate is $\geq 100$ mM, $\geq 150$ mM, $\geq 200$ mM, $\geq 250$ mM, $\geq 300$ mM, $\geq 350$ mM, $\geq 400$ mM, $\geq 450$ mM, $\geq 500$ mM, $\geq 600$ mM, $\geq 700$ mM, $\geq 800$ mM, $\geq 900$ mM, or $\geq 1000$ mM. In some cases, the concentration of salt in the intermediate eluate is 500 mM±50 mM. In some embodiments, the concentration of salt in the intermediate eluate is 250 mM, 300 mM, 350 mM, 400 mM, 450 mM, 500 mM, 550 mM, or 600 mM, where each value includes a variance of ±10%.

In some embodiments, the first chromatography step is selected from affinity chromatography or ion exchange chromatography. In some embodiments, the subsequent process step is a second chromatography step. In some cases, the subsequent process step is selected from affinity chromatography, ion exchange chromatography, mixed-mode chromatography or viral inactivation. In some cases, the methods discussed herein can be utilized between two ion exchange steps, in which the first ion exchange step increases the conductivity of the pool above the upper limit of which a subsequent ion exchange step can perform adequately. In some cases, the methods discussed herein can be utilized between two chromatography steps in which a first step introduces a chemical component that must be removed for a subsequent chromatography step to perform adequately. In some cases, the methods discussed herein can be utilized before viral filtration to reduce conductivity and thereby increase filtration performance and decrease run time. In some cases, the methods discussed herein can be utilized before mixed mode chromatography (MMC) to remove chemical components that interfere with or degrade the MMC media. For example, it is desirable to remove citrate from a stream that is incompatible with ceramic hydroxyapatite.

In some embodiments, the protein product is an antibody (e.g., a bispecific antibody).

Methods of Purifying Heterodimeric Proteins

Figure 1:
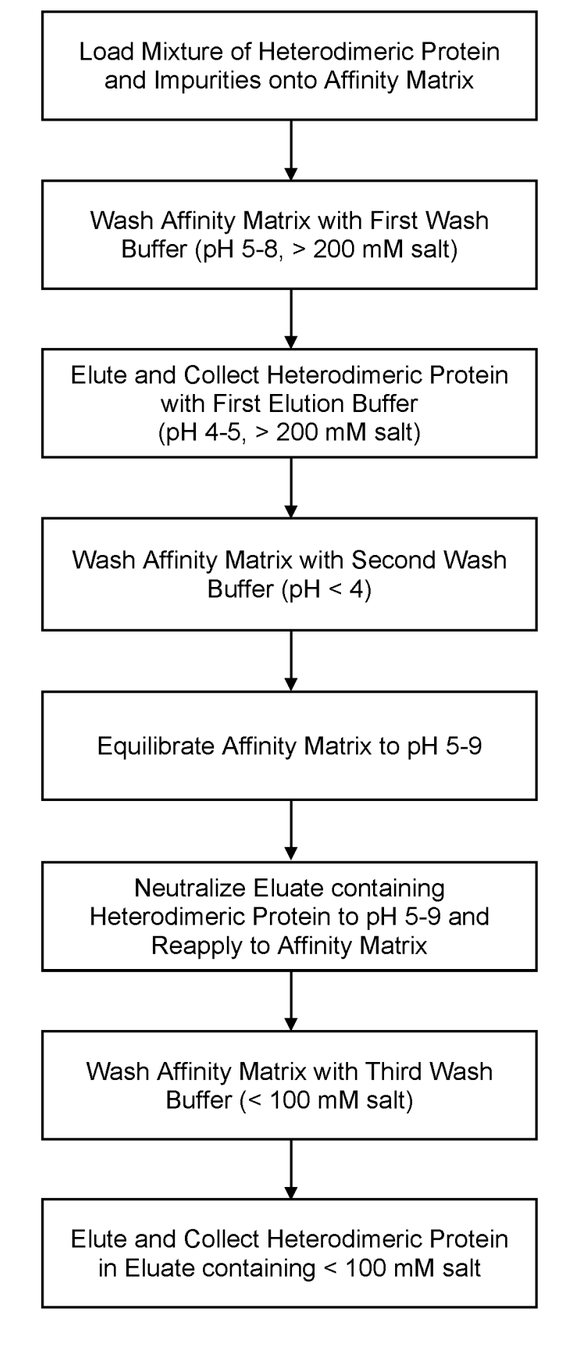
FIG. 1 is an illustration of a purification process in accordance with an embodiment of the invention.

Embodiments of methods of the present invention include the steps illustrated in FIG. 1. For example, the methods of purifying a heterodimeric protein include (a) loading a mixture of heterodimeric protein and impurities onto an affinity matrix, (b) washing the affinity matrix with a first wash buffer at a pH of from 5-8 and a salt concentration of greater than 200 mM, (c) eluting and collecting the heterodimeric protein with a first elution buffer at a pH of from 4-5 and a salt concentration of greater than 200 mM, (d) washing the affinity matrix with a second wash buffer at a pH of less than 4, (e) equilibrating the affinity matrix to a pH of from 5-9, (f) neutralizing the eluate containing the heterodimeric protein to a pH of from 5-9 and reapplying the neutralized eluate to the affinity matrix, (g) washing the affinity matrix with a third wash buffer containing less than 100 mM salt, and (h) eluting and collecting the heterodimeric protein in eluate containing less than 100 mM salt. In some embodiments, the methods further comprise an initial equilibration step, in which the affinity matrix is equilibrated to a pH of from 5-9. In some embodiments, the methods further comprise washing the affinity matrix with a wash buffer with less than 100 mM salt following the washing with the first wash buffer, but prior to elution and collection of the heterodimeric protein.

In various embodiments, loading the mixture of heterodimeric protein and impurities onto the affinity matrix includes loading clarified cell culture from one or more bioreactors containing the cells expressing the nucleotide sequences encoding the heterdimeric protein. For example, the cells may express the nucleotides encoding each of the heavy and light chains forming a bispecific antibody (e.g., a CD3×CD20 bispecific antibody, a MET×MET bispecific antibody in which the two arms bind distinct epitopes of MET, a CD3×BCMA bispecific antibody, a CD22×CD28 bispecific antibody, a PSMA×CD28 bispecific antibody, a CD3×PSMA bispecific antibody, a CD3×MUC16 bispecific antibody, a CD3×STEAP2 bispecific antibody, or the like). In some cases, each of the antigen-binding arms of the bispecific antibody comprises a common light chain. The clarified cell culture will include the heterodimeric protein (e.g., bispecific antibody), along with impurities such as homodimeric species, host cell proteins, and DNA. In some cases, the heterodimeric protein may be produced in eukaryotic cells, such as for example Chinese hamster ovary (CHO) cells.

In some embodiments, the mixture loaded onto the affinity matrix includes a mixture of proteins containing (i) a first homodimer comprising two copies of a first polypeptide, (ii) a heterodimer comprising the first polypeptide and a second polypeptide, and (iii) a second homodimer comprising two copies of the second polypeptide. The first and second polypeptides have different affinities for the affinity matrix, such that the first homodimer, the heterodimer and the second homodimer can be separated on the basis of differential binding to the affinity matrix. Differential binding to an affinity matrix can be manipulated by changing, inter alia, the pH and/or ionic strength of a solution passed over the affinity matrix.

In various embodiments, the salt discussed below or herein in connection with any buffer or eluate (or otherwise) is a salt comprising $Cl^-$, $Br^-$, $I^-$, $NO_3^-$, $N(CH_3)_4^+$, $NH_4^+$, $Cs^+$, $Rb^+$, $K^+$, $Na^+$, $H^+$, $Ca^{2+}$, $Mg^{2+}$ or $Al^{3+}$. In some embodiments, the salt comprises $Na^+$, $H^+$, $Ca^{2+}$, $Mg^{2+}$ or $Al^{3+}$. In some embodiments, the salt comprises $Cl^-$, $Br^-$, $I^-$, $NO_3^-$, or $ClO_4^-$. In some embodiments, the salt comprises combinations of $Na^+$, $H^+$, $Ca^{2+}$, $Mg^{2+}$ or $Al^{3+}$ with $Cl^-$, $Br^-$, $I^-$, $NO_3^-$, or $ClO_4^-$. In some embodiments, the salt is selected from $CaCl_2$, $MgCl_2$ or NaCl. In some embodiments, the salt is NaCl. In some embodiments, the salt is $CaCl_2$. In some embodiments, the salt is $MgCl_2$.

Following loading of the clarified cell culture, the affinity matrix is washed with a wash buffer (first wash buffer of FIG. 1) comprising greater than 200 mM salt and a pH of from 5 to 9. In some cases, the pH of the wash buffer is from 6 to 8. In some cases, the pH of the wash buffer is from about 7 to about 7.5. In various embodiments, the pH of the wash buffer is or is about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9 or 9.0. In some embodiments, the pH of the wash buffer is or is about 7.2. In various embodiments, the buffer can be any buffer capable of maintaining the pH at the desired point or within the desired range. In various embodiments, the buffer concentration may be from about 5 mM to about 100 mM. In some cases, the buffer concentration is from about 5 mM to about 15 mM. In some cases, the buffer concentration is from about 5 mM to about 50 mM. In some cases, the buffer concentration is from about 10 mM to about 25 mM. In some cases, the buffer concentration is from about 20 mM to about 40 mM. In some cases, the buffer concentration is from about 30 mM to about 50 mM. In various embodiments, the buffer concentration is or is about 5 mM, 6 mM, 7 mM, 8 mM, 9 mM, 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, or 50 mM. In some embodiments, the wash buffer concentration is or is about 10 mM. In some embodiments, the wash buffer concentration is or is about 40 mM. In some embodiments, the wash buffer is sodium phosphate.

In some cases, the wash buffer comprises salt at a concentration of from about 200 mM to about 800 mM. In some cases, the wash buffer comprises salt at a concentration of from about 250 mM to about 750 mM. In some cases, the wash buffer comprises salt at a concentration of from about 300 mM to about 700 mM. In some cases, the wash buffer comprises salt at a concentration of from about 350 mM to about 650 mM. In some cases, the wash buffer comprises salt at a concentration of from about 400 mM to about 600 mM. In some cases, the wash buffer comprises salt at a concentration of from about 450 mM to about 550 mM. In some cases, the wash buffer comprises salt at a concentration of or of about 200 mM, 210, mM, 220 mM, 225 mM, 230 mM, 240 mM, 250 mM, 260 mM, 270 mM, 275 mM, 280 mM, 290 mM, 300 mM, 310 mM, 320 mM, 325 mM, 330 mM, 340 mM, 350 mM, 360 mM, 370 mM, 375 mM, 380 mM, 390 mM, 400 mM, 410 mM, 420 mM, 425 mM, 430 mM, 440 mM, 450 mM, 460 mM, 470 mM, 475 mM, 480 mM, 490 mM, 500 mM, 510 mM, 520 mM, 525 mM, 530 mM, 540 mM, 550 mM, 560 mM, 570 mM, 575 mM, 580 mM, 590 mM, 600 mM, 610 mM, 620 mM, 625 mM, 630 mM, 640 mM, 650 mM, 660 mM, 670 mM, 675 mM, 680 mM, 690 mM, 700 mM, 710 mM, 720 mM, 725 mM, 730 mM, 740 mM, 750 mM, 760 mM, 770 mM, 780 mM, 790 mM or 800 mM. In some embodiment, the salt concentration of the wash buffer is or is about 500 mM. In some embodiments, the wash buffer comprises about 500 mM NaCl. In some cases, this wash of the affinity matrix removes unbound impurities such as host cell protein, DNA and homodimeric species with little or no affinity for the affinity matrix material (e.g., Protein A).

In some embodiments, the methods include an optional second wash, prior to elution of the heterodimeric protein, with a wash buffer comprising little (<25 mM) or no salt at a pH of from 5 to 9. In some embodiments, this wash buffer comprises from about 10 mM to about 50 mM Tris [tris (hydroxymethyl)aminomethane]], sodium phosphate, or acetate, or combinations thereof. In various embodiments, this wash buffer has a pH that is equal to the pH of the first wash buffer discussed above.

Following the wash or washes discussed above, the heterodimeric protein is eluted from the affinity matrix in an elution buffer (first elution buffer of FIG. 1) and collected in an eluate. The elution buffer has a pH of from about 4 to about 5, and includes salt at a concentration of greater than 200 mM. In some embodiments, the pH of the elution buffer is from about 4.0 to about 4.2. In some embodiments, the pH of the elution buffer is from about 4.4 to about 4.6. In various embodiments, the pH of the elution buffer is or is about 4.0, 4.05, 4.1, 4.15, 4.2, 4.25, 4.3, 4.35, 4.4, 4.45, 4.5, 4.55, 4.6, 4.65, 4.7, 4.75, 4.8, 4.85, 4.9, 4.95 or 5.0. In some embodiments, the pH of the elution buffer is 4.1. In some embodiments, the pH of the elution buffer is 4.55. In various embodiments, the buffer can be any buffer capable of maintaining the pH at the desired point or within the desired range. In various embodiments, the buffer concentration may be from about 5 mM to about 100 mM. In some cases, the buffer concentration is from about 25 mM to about 55 mM. In some cases, the buffer concentration is from about 30 mM to about 50 mM. In various embodiments, the buffer concentration is or is about 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, or 50 mM. In some embodiments, the elution buffer concentration is or is about 40 mM. In some embodiments, the elution buffer is acetic acid. In some embodiments, the elution buffer is acetate.

In some cases, the elution buffer comprises salt at a concentration of from about 200 mM to about 800 mM. In some cases, the elution buffer comprises salt at a concentration of from about 250 mM to about 750 mM. In some cases, the elution buffer comprises salt at a concentration of from about 300 mM to about 700 mM. In some cases, the elution buffer comprises salt at a concentration of from about 350 mM to about 650 mM. In some cases, the elution buffer comprises salt at a concentration of from about 400 mM to about 600 mM. In some cases, the elution buffer comprises salt at a concentration of from about 450 mM to about 550 mM. In some cases, the elution buffer comprises salt at a concentration of or of about 200 mM, 210, mM, 220 mM, 225 mM, 230 mM, 240 mM, 250 mM, 260 mM, 270 mM, 275 mM, 280 mM, 290 mM, 300 mM, 310 mM, 320 mM, 325 mM, 330 mM, 340 mM, 350 mM, 360 mM, 370 mM, 375 mM, 380 mM, 390 mM, 400 mM, 410 mM, 420 mM, 425 mM, 430 mM, 440 mM, 450 mM, 460 mM, 470 mM, 475 mM, 480 mM, 490 mM, 500 mM, 510 mM, 520 mM, 525 mM, 530 mM, 540 mM, 550 mM, 560 mM, 570 mM, 575 mM, 580 mM, 590 mM, 600 mM, 610 mM, 620 mM, 625 mM, 630 mM, 640 mM, 650 mM, 660 mM, 670 mM, 675 mM, 680 mM, 690 mM, 700 mM, 710 mM, 720 mM, 725 mM, 730 mM, 740 mM, 750 mM, 760 mM, 770 mM, 780 mM, 790 mM or 800 mM. In some embodiment, the salt concentration of the elution buffer is or is about 500 mM. In some embodiments, the elution buffer comprises about 500 mM NaCl. In some embodiments, the elution buffer comprises about 500 mM $CaCl_2$. In some embodiments, the elution buffer comprises about 500 mM $MgCl_2$.

Following elution and collection of the heterodimeric protein from the affinity matrix, the affinity matrix is washed with a wash buffer (second wash buffer of FIG. 1) at a pH of less than about 4. In some embodiments, the pH of the wash buffer is from about 2.5 to about 3.5. In some embodiments, the pH of the wash buffer is 3.0±0.2. In various embodiments, the pH of the wash buffer is or is about 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8 or 3.9. The wash buffer can comprise any suitable material to provide the pH or range of pH noted above. In some embodiments, the wash buffer comprises acetic acid at a concentration of from about 20 mM to about 60 mM. In some embodiments, the wash buffer comprises acetic acid at a concentration of from about 30 mM to about 50 mM. In some cases, the wash buffer comprises about 40 mM acetic acid. In some cases, this wash of the affinity matrix removes formerly bound impurities such as homodimeric species with greater affinity for the affinity matrix material (e.g., Protein A) than the heterodimeric protein. In some cases, the methods of the present invention may also include a further wash of the affinity matrix with a buffer comprising a lower pH (e.g. 2.45±0.2) and a higher concentration of the buffer material (e.g. 500 mM acetic acid) than the wash buffer discussed immediately above.

Following removal of additional impurities with the wash (or washes) discussed above, the affinity matrix is re-equilibrated to a pH of from 5 to 9. In various embodiments, the affinity matrix is equilibrated to a pH of or of about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9 or 9.0. In some embodiments, the affinity matrix is equilibrated to a pH of about 7.2. Equilibration can be performed with an equilibration buffer having the desired pH. In various embodiments, the buffer can be any buffer capable of maintaining the pH at the desired point or within the desired range. In various embodiments, the buffer concentration may be from about 5 mM to about 100 mM. In some cases, the buffer concentration is from about 10 mM to about 30 mM. In some cases, the buffer concentration is from about 30 mM to about 50 mM. In some cases, the buffer concentration is from about 40 mM to about 60 mM. In various embodiments, the buffer concentration is or is about 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM or 60 mM. In some embodiments, the buffer concentration is or is about 20 mM. In some embodiments, the buffer concentration is or is about 40 mM. In some embodiments, the buffer concentration is or is about 50 mM. In some embodiments, the buffer is sodium phosphate. In some embodiments, this buffer comprises from about 10 mM to about 50 mM Tris, sodium phosphate, or acetate, or combinations thereof.

Following equilibration of the affinity matrix, the neutralized eluate containing the heterodimeric protein (now purified from the homodimeric contaminants and other impurities) is reapplied to the same affinity matrix used in the purification process steps discussed above at a pH of from 5 to 9. In various embodiments, the neutralized eluate is reapplied to the affinity matrix at a pH of or of about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9 or 9.0. In some embodiments, the pH is or is about 7.2.

Following reapplication of the neutralized eluate to the affinity matrix, the matrix is washed with a wash buffer (third wash buffer of FIG. 1) at a neutral pH and with a salt concentration of less than 100 mM. In general, the pH of this wash buffer will correspond closely with the pH of the neutralized eluate reapplied to the affinity matrix, as discussed above. In various embodiments, the salt concentration of this wash buffer will be from about 0 mM to about 100 mM, from about 0 mM to about 75 mM, from about 0 mM to about 50 mM, from about 0 mM to about 25 mM, or from about 0 mM to about 10 mM. In various embodiments, the salt concentration of this wash buffer is or is about 99 mM, 95 mM, 90 mM, 85 mM, 80 mM, 75 mM, 70 mM, 65 mM, 60 mM, 55 mM, 50 mM, 45 mM, 40 mM, 35 mM, 30 mM, 25 mM, 20 mM, 15 mM, 10 mM, 5 mM or less, is or 0 mM. In various embodiments, the buffer can be any buffer capable of maintaining the pH at the desired point or within the desired range. In various embodiments, the buffer concentration may be from about 5 mM to about 100 mM. In some cases, the buffer concentration is from about 10 mM to about 30 mM. In some cases, the buffer concentration is from about 30 mM to about 50 mM. In some cases, the buffer concentration is from about 40 mM to about 60 mM. In various embodiments, the buffer concentration is or is about 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM or 60 mM. In some embodiments, the wash buffer concentration is or is about 20 mM. In some embodiments, the wash buffer concentration is or is about 40 mM. In some embodiments, the wash buffer concentration is or is about 50 mM. In some embodiments, the wash buffer is sodium phosphate. In some embodiments, this wash buffer comprises from about 10 mM to about 50 mM Tris, sodium phosphate, or acetate, or combinations thereof.

Following the wash discussed above, the purified heterodimeric protein is eluted and collected from the affinity matrix in an eluate containing less than about 100 mM salt. In various embodiments, the salt concentration of the eluate is or is about 99 mM, 95 mM, 90 mM, 85 mM, 80 mM, 75 mM, 70 mM, 65 mM, 60 mM, 55 mM, 50 mM, 45 mM, 40 mM, 35 mM, 30 mM, 25 mM, 20 mM, 15 mM, 10 mM, 5 mM or less, is or 0 mM. In general, elution of the heterodimeric protein is performed with a buffer at a pH of less than about 4. In some embodiments, the pH of the elution buffer is from about 2.5 to about 3.5. In some embodiments, the pH of the elution buffer is 3.0±0.2. In various embodiments, the pH of the elution buffer is or is about 2.5, 2.6, 2.7, 2.8, 2.9, 3.0, 3.1, 3.2, 3.3, 3.4, 3.5, 3.6, 3.7, 3.8 or 3.9. The elution buffer can comprise any suitable material to provide the pH or range of pH noted above. In some embodiments, the elution buffer comprises acetic acid at a concentration of from about 20 mM to about 60 mM. In some embodiments, the elution buffer comprises acetic acid at a concentration of from about 30 mM to about 50 mM. In some cases, the elution buffer comprises about 40 mM acetic acid.

In various embodiments, loading of the affinity matrix from clarified cell culture or from the neutralized eluate containing the heterodimeric protein can include addition of material of up to about 75 g/L of affinity matrix resin. In various embodiments, the affinity matrix is loaded with less than or equal to 65 g/L, 60 g/L, 55 g/L or 50 g/L of material.

In various embodiments of the methods discussed herein, neither diafiltration nor ultrafiltration is used to remove salts from the purified heterodimeric protein eluate. Dilution of the desired product is also not necessary to reduce the salt concentration for subsequent processing. This lowering of salt concentration without dilution, ultrafiltration, or diafiltration reduces the equipment and tankage footprint needed for the purification of these bispecific antibodies.

In some embodiments, the affinity matrix comprises a ligand (e.g., Protein A) affixed to a substrate. In some cases, the substrate is a bead or particle, such that the affinity matrix is a plurality of particles affixed with the ligand. In various embodiments, the ligand is Protein A or Protein G. When the ligand is Protein A, the Protein A may be a naturally occurring or modified Staphylococcal Protein A, or it may be an engineered Protein A. Engineered Protein A may be for example a Z-domain tetramer, a Y-domain tetramer, or an engineered Protein A that lacks D and E domains. These engineered Protein A exemplars are unable to bind (or bind with very low affinity if at all) to the VH3 domain of an immunoglobulin, but can still bind to the CH3 domains of IgG1, IgG2 and IgG4.

In some cases, the affinity matrix substrate contains or is made of agarose, poly(styrene divinylbenzene), polymethacrylate, controlled pore glass, spherical silica, cellulose and the like. In the embodiments in which the substrate is shaped as a bead or particle, the mean diameter of the particles is from 25 μm to 100 μm. In some embodiments, the mean diameter of the particles is from about 40 μm to about 60 μm. In some embodiments, the mean diameter of the particles is from about 45 μm to about 55 μm. In some embodiments, the mean diameter of the particles is from about 40, 41, 42, 43, 44, 45, 46, 47, 48, 49, 50, 51, 52, 53, 54 or 55 μm. In some cases, the mean diameter of the particles is about 45 μm. In some cases, the mean diameter of the particles is about 50 μm. In some embodiments, the particles have a mean diameter of 35 μm, 45 μm, 60 μm, 75 μm, or 85 μm. In some embodiments, the particles contain pores having a mean diameter of about 1000 Å, 1050 Å, 1100 Å, 1150 Å or 1200 Å. In some embodiments, the particles contain pores having a mean diameter of about 1100 Å.

In some embodiments of the methods, the heterodimeric protein is a bispecific antibody comprising a first polypeptide comprising a CH3 domain that is capable of binding to Protein A ("Fc") and a second polypeptide comprising a CH3 domain that is not capable of binding to Protein A ("Fc*"). In some cases, the second polypeptide comprises a H435R/Y436F (by EU numbering system; H95R/Y96F by IMGT exon numbering system) substitution in its CH3 domain (a.k.a "Fc*" or "star substitution"). Thus, in some embodiments, the first homodimer is a monospecific antibody having two unsubstituted CH3 domains (i.e., FcFc); the second homodimer is a monospecific antibody having two H435R/Y436F substituted CH3 domains (i.e., Fc*Fc*); and the heterodimeric protein is a bispecific antibody having one unsubstituted CH3 domain and one H435R/Y436F substituted CH3 domain (i.e., Fc*Fc).

EXAMPLES

Example 1: Purification of a CD3×CD20 Bispecific Antibody (BsAb1)

Purification of BsAb1 was performed as a two-step process, including an affinity resolving chromatographic step and an affinity capture chromatographic step. The affinity resolving step captured the bispecific antibody from clarified conditioned medium, thereby reducing product volume, increasing protein concentration, and increasing bispecific purity through removal of the Fc*Fc* and FcFc homodimer species. Following elution of the bispecific antibody from the affinity resolving process, the eluate was adjusted to a higher pH (~7.2) in preparation for subsequent reloading onto the same affinity column for purpose of buffer exchange and viral inactivation. The affinity capture step captured the bispecific antibody from a neutral affinity resolving pool, thereby reducing product volume, increasing protein concentration, and removing salt from the eluate used in the affinity resolving step: all without the need for ultrafiltration, diafiltration, or dilution that would require increased equipment and tankage requirements. Both chromatographic steps employed the same matrix comprising a MabSelect SuRe™ pcc resin (GE Healthcare Life Sciences), which comprises a tetramer of the Z-domain.

Viral inactivation followed the affinity capture process and included holding the bispecific antibody pool at a pH of from 3.50-3.65 (with 0.25 M glycine HCl) for from 30-50 minutes. Pool filtration of the bispecific antibody followed the viral inactivation at a neutral pH.

The purification process included the affinity resolving and affinity capture steps shown in Tables 1 and 2, respectively.

TABLE 1

Affinity Resolving Process Steps

| Description | Solution | Volume | Residence Time (min) |
|---|---|---|---|
| Equilibration | 20 mM Sodium Phosphate, pH 7.2 ± 0.1 | 2 CV | 6 |
| Load | Clarified Cell Culture | ≤65.0 g/L resin | 6 |
| Wash 1 | 10 mM Sodium Phosphate, 500 mM NaCl, pH 7.2 ± 0.1 | 3 CV | 6 |
| Wash 2 | 20 mM Sodium Phosphate, pH 7.2 ± 0.1 | 2 CV | 6 |
| Elution | 40 mM Acetic Acid, 500 mM NaCl, pH 4.10 ± 0.05 | 6 CV | 6 |
| Strip 1 | 40 mM Acetic Acid, pH 3.0 ± 0.2 | 2 CV | 6 |
| Strip 2 | 500 mM Acetic Acid, pH 2.45 ± 0.20 | 2 CV | 6 |

CV—column volume

TABLE 2

Affinity Capture Process Steps

| Description | Solution | Volume | Residence Time (min) |
|---|---|---|---|
| Equilibration | 20 mM Sodium Phosphate, pH 7.2 ± 0.1 | 2 CV | 6 |
| Load | Neutralized Affinity Resolving Pool | ≤65.0 g/L resin | 6 |
| Wash | 20 mM Sodium Phosphate, pH 7.2 ± 0.1 | 2 CV | 6 |
| Elution | 40 mM Acetic Acid, pH 3.0 ± 0.2 | 3.5 CV | 8 |
| Strip | 500 mM Acetic Acid, pH 2.45 ± 0.20 | 2 CV | 6 |

CV—column volume

Results: multiple purification runs produced an average bispecific purity of 97.1% with a bispecific yield through filtration following viral inactivation of 92.8% for BsAb1. A reduction in conductivity from about 71.79 mS/cm to <2.0 mS/cm was achieved. Comparable results were achieved for BsAb1 in which the elution step of the affinity resolving process utilized 500 mM $CaCl_2$) at pH 4.45 in place of the sodium chloride noted in Table 1.

Example 2: Purification of a MET×MET (Different Epitopes) Bispecific Antibody (BsAb2)

Purification of BsAb2 was performed according to the process described in Example 1, but included the affinity resolving and affinity capture steps shown in Tables 3 and 4, respectively.

TABLE 3

Affinity Resolving Process Steps

| Description | Solution | Volume | Residence Time (min) |
|---|---|---|---|
| Equilibration | 10 mM Sodium Phosphate, 500 mM NaCl, H 7.2 ± 0.1 | 3 CV | 6 |
| Load | Clarified Cell Culture | ≤60.0 g/L resin | 6 |
| Wash 1 | 10 mM Sodium Phosphate, 500 mM NaCl, pH 7.2 ± 0.1 | 5 CV | 6 |
| Wash 2 | 50 mM Tris, pH 7.2 ± 0.1 | 2 CV | 6 |
| Elution | 40 mM Acetate, 500 mM $CaCl_2$, pH 4.55 ± 0.05 | 7 CV | 6 |
| Strip 1 | 40 mM Acetic Acid, pH 3.0 ± 0.2 | 2 CV | 6 |
| Strip 2 | 500 mM Acetic Acid | 2 CV | 6 |

CV—column volume

TABLE 4

Affinity Capture Process Steps

| Description | Solution | Volume | Residence Time (min) |
|---|---|---|---|
| Equilibration | 50 mM Tris, pH 7.2 ± 0.1 | 4 CV | 6 |
| Load | Neutralized Affinity Resolving Pool | ≤60.0 g/L resin | 6 |
| Wash | 50 mM Tris, pH 7.2 ± 0.1 | 2 CV | 6 |
| Elution | 40 mM Acetic Acid, pH 3.0 ± 0.2 | 3.5 CV | 8 |
| Strip | 500 mM Acetic Acid | 2 CV | 6 |

CV—column volume

Results: multiple purification runs produced an average bispecific purity of 96.0%±0.7% with a bispecific yield through filtration following viral inactivation of 90.9% for BsAb2. A reduction in conductivity from about 70.75 mS/cm to <2.0 mS/cm was achieved.

Example 3: Purification of a BCMAxCD3 Bispecific Antibody (BsAb3)

Purification of BsAb3 was performed according to the process described in Example 1, but included the affinity resolving and affinity capture steps shown in Tables 5 and 6, respectively.

TABLE 5

Affinity Resolving Process Steps

| Description | Solution | Volume | Residence Time (min) |
|---|---|---|---|
| Equilibration | 10 mM Sodium Phosphate, 500 mM NaCl, pH 7.2 ± 0.1 | 3 CV | 6 |
| Load | Clarified Cell Culture | ≤60.0 g/L resin | 6 |
| Wash 1 | 10 mM Sodium Phosphate, 500 mM NaCl, pH 7.2 ± 0.1 | 3 CV | 6 |
| Wash 2 | 50 mM Tris, pH 7.2 ± 0.1 | 2 CV | 6 |
| Elution | 40 mM Acetate, 500 mM CaCl$_2$, pH 4.55 ± 0.05 | 6 CV | 6 |
| Strip 1 | 40 mM Acetic Acid, pH 3.0 ± 0.2 | 2 CV | 6 |
| Strip 2 | 500 mM Acetic Acid | 2 CV | 6 |

CV—column volume

TABLE 6

Affinity Capture Process Steps

| Description | Solution | Volume | Residence Time (min) |
|---|---|---|---|
| Equilibration | 50 mM Tris, pH 7.2 ± 0.1 | 4 CV | 6 |
| Load | Neutralized Affinity Resolving Pool | ≤50.0 g/L resin | 6 |
| Wash | 50 mM Tris, pH 7.2 ± 0.1 | 2 CV | 6 |
| Elution | 40 mM Acetic Acid, pH 3.0 ± 0.2 | 3.5 CV | 8 |
| Strip | 500 mM Acetic Acid | 2 CV | 6 |

CV—column volume

Results: multiple purification runs produced an average bispecific purity of 97.4%±0.5% with a bispecific yield through filtration following viral inactivation of 93.4% for BsAb3. A reduction in conductivity from about 72.80 mS/cm to <2.0 mS/cm was achieved.

Example 4: Purification of a BCMAxCD3 Bispecific Antibody (BsAb4)

Purification of BsAb4 was performed according to the process described in Example 1, but included the affinity resolving and affinity capture steps shown in Tables 7 and 8, respectively.

TABLE 7

Affinity Resolving Process Steps

| Description | Solution | Volume | Residence Time (min) |
|---|---|---|---|
| Equilibration | 10 mM Sodium Phosphate, 500 mM NaCl, pH 7.2 ± 0.1 | 3 CV | 6 |
| Load | Clarified Cell Culture | ≤55.0 g/L resin | 6 |
| Wash 1 | 10 mM Sodium Phosphate, 500 mM NaCl, pH 7.2 ± 0.1 | 3 CV | 6 |
| Wash 2 | 50 mM Tris, pH 7.2 ± 0.1 | 2 CV | 6 |
| Elution | 40 mM Acetate, 500 mM CaCl$_2$, pH 4.55 ± 0.05 | 6 CV | 6 |
| Strip 1 | 40 mM Acetic Acid, pH 3.0 ± 0.2 | 2 CV | 6 |
| Strip 2 | 500 mM Acetic Acid | 2 CV | 6 |

CV—column volume

TABLE 8

Affinity Capture Process Steps

| Description | Solution | Volume | Residence Time (min) |
|---|---|---|---|
| Equilibration | 50 mM Tris, pH 7.2 ± 0.1 | 4 CV | 6 |
| Load | Neutralized Affinity Resolving Pool | ≤55.0 g/L resin | 6 |
| Wash | 50 mM Tris, pH 7.2 ± 0.1 | 2 CV | 6 |
| Elution | 40 mM Acetic Acid, pH 3.0 ± 0.2 | 3.5 CV | 8 |
| Strip | 500 mM Acetic Acid | 2 CV | 6 |

CV—column volume

Results: multiple purification runs produced an average bispecific purity of 94.6%±1.0% with a bispecific yield through filtration following viral inactivation of 86.0% for BsAb4. A reduction in conductivity from about 70.78 mS/cm to <2.0 mS/cm was achieved

Example 5: Purification of a PSMAxCD28 Bispecific Antibody (BsAb5)

Purification of BsAb5 was performed according to the process described in Example 1, but included the affinity resolving and affinity capture steps shown in Tables 9 and 10, respectively.

TABLE 9

Affinity Resolving Process Steps

| Description | Solution | Volume | Residence Time (min) |
|---|---|---|---|
| Equilibration | 10 mM Sodium Phosphate, 500 mM NaCl, pH 7.2 ± 0.1 | 4 CV | 6 |
| Load | Clarified Cell Culture | ≤55.0 g/L resin | 6 |
| Wash 1 | 10 mM Sodium Phosphate, 500 mM NaCl, pH 7.2 ± 0.1 | 5 CV | 6 |
| Wash 2 | 50 mM Tris, pH 7.2 ± 0.1 | 2 CV | 6 |
| Elution | 40 mM Acetate, 500 mM CaCl$_2$, pH 4.50 ± 0.05 | 7 CV | 6 |
| Strip 1 | 40 mM Acetic Acid, pH 3.0 ± 0.2 | 3 CV | 6 |
| Strip 2 | 500 mM Acetic Acid | 2 CV | 6 |

CV—column volume

TABLE 10

Affinity Capture Process Steps

| Description | Solution | Volume | Residence Time (min) |
|---|---|---|---|
| Equilibration | 50 mM Tris, pH 7.2 ± 0.1 | 5 CV | 6 |
| Load | Neutralized Affinity Resolving Pool | ≤58.0 g/L resin | 6 |
| Wash | 50 mM Tris, pH 7.2 ± 0.1 | 2 CV | 6 |
| Elution | 40 mM Acetic Acid, pH 3.0 ± 0.2 | 3.5 CV | 8 |
| Strip | 500 mM Acetic Acid | 2 CV | 6 |

CV—column volume

Results: multiple purification runs produced an average bispecific purity of 96.1%±0.9% with a bispecific yield through filtration following viral inactivation of 92.4% for BsAb5. A reduction in conductivity from about 75.09 mS/cm to <2.0 mS/cm was achieved.

Example 6: Purification of a CD22×CD28 Bispecific Antibody (BsAb6)

Purification of BsAb6 was performed according to the process described in Example 1, but included the affinity resolving and affinity capture steps shown in Tables 11 and 12, respectively.

TABLE 11

Affinity Resolving Process Steps

| Description | Solution | Volume | Residence Time (min) |
|---|---|---|---|
| Equilibration | 40 mM Sodium Phosphate, 500 mM NaCl, pH 7.2 ± 0.1 | 2 CV | 6 |
| Load | Clarified Cell Culture | ≤55.0 g/L resin | 6 |
| Wash 1 | 40 mM Sodium Phosphate, 500 mM NaCl, pH 7.2 ± 0.1 | 5 CV | 6 |
| Wash 2 | 40 mM Tris, 10 mM Acetate, pH 7.2 ± 0.1 | 2 CV | 6 |
| Elution | 40 mM Acetate, 500 mM $CaCl_2$, pH 4.55 ± 0.05 | 7 CV | 6 |
| Strip 1 | 40 mM Acetic Acid, pH 3.0 ± 0.2 | 2 CV | 6 |
| Strip 2 | 500 mM Acetic Acid | 2 CV | 6 |

CV—column volume

TABLE 12

Affinity Capture Process Steps

| Description | Solution | Volume | Residence Time (min) |
|---|---|---|---|
| Equilibration | 40 mM Tris, 10 mM Acetate, pH 7.2 ± 0.1 | 2.5 CV | 6 |
| Load | Neutralized Affinity Resolving Pool | ≤60.0 g/L resin | 6 |
| Wash | 40 mM Tris, 10 mM Acetate, pH 7.2 ± 0.1 | 2 CV | 6 |
| Elution | 40 mM Acetic Acid, pH 3.0 ± 0.2 | 3.5 CV | 8 |
| Strip | 500 mM Acetic Acid | 2 CV | 6 |

CV—column volume

Results: multiple purification runs produced an average bispecific purity of 96.5%±0.7% with a bispecific yield through filtration following viral inactivation of 92.8% for BsAb6. A reduction in conductivity from about 71.78 mS/cm to <2.0 mS/cm was achieved.

Example 7: Quality Improvement in Product Produced by Affinity Desalting Compared to UFDF Measurements of high molecular weight (HMW) species present in a composition of BsAb1 (CD3×CD20) demonstrate an additional advantage of utilizing reapplication of a purified heterodimeric product to an existing affinity column rather than use of ultrafiltration/diafiltration (UFDF). As shown in Table 13, below, reapplication of the purified bispecific antibody to the existing affinity column further reduced HMW species by 0.88%, whereas the use of UFDF increased HMW of the same purified bispecific antibody by 0.12%.

TABLE 13

Change in High Molecular Weight Species

| Salt Removal | Load HMW % | Pool HMW % | Δ HMW % |
|---|---|---|---|
| UFDF | 0.73 | 0.85 | +0.12 |
| Reapplication to Affinity Column | 4.78 | 3.90 | −0.88 |

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A method of removing a component from a Protein A affinity chromatographic eluate comprising a bispecific antibody, wherein the component is a salt, and the bispecific antibody comprises a first heavy chain and a second heavy chain, wherein the first heavy chain and the second heavy chain are both of isotype IgG1 or are both of isotype IgG4, and both comprise CH1, CH2 and CH3 domains, and wherein the first heavy chain or the second heavy chain, but not both, contains H435R and Y436F substitutions (EU numbering), the method comprising:
   (a) performing a first chromatography step of purifying the bispecific antibody in which the component is present in a first buffer applied to a Protein A chromatographic column;
   (b) collecting an intermediate eluate from the first chromatography step, wherein the intermediate eluate contains the bispecific antibody and the component;
   (c) reapplying the intermediate eluate to the Protein A affinity chromatographic column, and eluting the bispecific antibody with a second buffer containing the component at a concentration lower than that of the intermediate eluate that was reapplied to the Protein A affinity chromatographic column; and
   (d) collecting the chromatographic eluate from step (c), wherein the component is present in the chromatographic eluate at a concentration lower than that of the intermediate eluate.

2. The method of claim 1, wherein the component is absent from the second buffer.

3. The method of claim 1, wherein the salt is selected from a salt containing (i) $Cl^-$, $Br^-$, $I^-$, $NO_3^-$, $N(CH_3)_4^+$, $NH_4^+$, $Cs^+$, $Rb^+$, $K^+$, $Na^+$, $Ca^{2+}$, $Mg^{2+}$, or $Al^{3+}$; (ii) combinations of $Na^+$, $Ca^{2+}$, $Mg^{2+}$ or $Al^{3+}$ with $Cl^-$, $Br^-$, $I^-$, $NO_3^-$, or $ClO_4^-$, or (iii) $CaCl_2$), $MgCl_2$ or $NaCl$.

4. The method of claim 3, wherein the concentration of the salt in the intermediate eluate is greater than 50 mM.

5. The method of claim 4, wherein the concentration of the salt in the intermediate eluate is ≥100 mM, ≥250 mM, or ≥500 mM.

6. The method of claim 1, wherein the Protein A affinity chromatographic column comprises an affinity matrix comprising a Protein A ligand affixed to a substrate, and the Protein A ligand is an engineered Protein A comprising a Z-domain tetramer, an engineered Protein A comprising a Y-domain tetramer, or an engineered Protein A that lacks D and E domains.

7. The method of claim 6, wherein the substrate is a particle and the affinity matrix comprises a multiplicity of the particles comprising a mean diameter of 25 μm to 100 μm.

8. A method of purifying a bispecific antibody, comprising:
(a) introducing a mixture of a bispecific antibody and impurities to an affinity matrix containing a protein-binding ligand comprising Protein A, wherein the bispecific antibody comprises a first heavy chain and a second heavy chain, wherein the first heavy chain and the second heavy chain are both of isotype IgG1 or are both of isotype IgG4, and both comprise CH1, CH2 and CH3 domains, and wherein the first heavy chain or the second heavy chain, but not both, contains H435R and Y436F substitutions (EU numbering) and wherein at least one impurity binds the protein-binding ligand and at least one impurity does not bind the protein-binding ligand or has a reduced affinity for the protein-binding ligand relative to the impurity that binds the protein-binding ligand;
(b) washing the affinity matrix with a first wash buffer comprising a salt concentration greater than 200 mM and a first pH of from 5 to 9 to remove the at least one impurity that does not bind the protein-binding ligand or has a reduced affinity for the protein binding ligand;
(c) eluting and collecting the bispecific antibody from the affinity matrix in a first elution buffer comprising a salt at a concentration greater than 200 mM and a second pH of from 4 to 5 to obtain a purified bispecific antibody in a first eluate;
(d) washing the affinity matrix with a second wash buffer comprising a third pH of less than 4 to remove the at least one impurity that binds the protein-binding ligand;
(e) equilibrating the affinity matrix to a fourth pH of from 5 to 9;
(f) neutralizing the first eluate to a pH of 5 to 9, then reapplying the first eluate to the affinity matrix;
(g) washing the affinity matrix with a third wash buffer comprising less than 100 mM salt; and
(h) eluting and collecting the purified bispecific antibody in a second eluate, wherein the second eluate comprises less than 100 mM of the salt.

9. The method of claim 8, wherein the third wash buffer comprises less than 50 mM salt.

10. The method of claim 8, wherein the impurities comprise homodimeric species comprising the first heavy chain or the second heavy chain.

11. The method of claim 8, wherein the affinity matrix comprises the Protein A ligand affixed to a substrate.

12. The method of claim 11, wherein the Protein A ligand is an engineered Protein A comprising a Z-domain tetramer, an engineered Protein A comprising a Y-domain tetramer, or an engineered Protein A that lacks D and E domains.

13. The method of claim 11, wherein the substrate is a particle and the affinity matrix comprises a multiplicity of the particles comprising a mean diameter of from 25 μm to 100 μm.

14. The method of claim 13, wherein the particles comprise a mean diameter of from 40 μm to 60 μm.

15. The method of claim 14, wherein the particles comprise a mean diameter of from 45 μm to 55 μm.

16. The method of claim 15, wherein the particles comprise a mean diameter of about 50 μm.

17. The method of claim 11, wherein the substrate comprises any one or more of agarose, poly(styrene divinylbenzene), polymethacrylate, cellulose, controlled pore glass, and spherical silica.

18. The method of claim 13, wherein the particles comprise pores having a mean diameter of about 1100 Å.

19. The method of claim 8, wherein the first elution buffer comprises a salt at a concentration of greater than 250 mM.

20. The method of claim 19, wherein the first elution buffer comprises a salt at a concentration greater than 300 mM or greater than 400 mM.

21. The method of claim 20, wherein the first elution buffer comprises a salt at a concentration of about 500 mM.

22. The method of claim 8, wherein the salt is selected from a salt containing (i) $Cl^-$, $Br^-$, $I^-$, $NO_3^-$, $N(CH_3)_4^+$, $NH_4^+$, $Cs^+$, $Rb^+$, $K^+$, $Na^+$, $Ca^{2+}$, $Mg^{2+}$, $Al^{3+}$; (ii) combinations of $Na^+$, $Ca^{2+}$, $Mg^{2+}$ or $Al^{3+}$ with $Cl^-$, $Br^-$, $I^-$, $NO_3^-$, or $ClO_4^-$, or (iii) $CaCl_2$), $MgCl_2$ or NaCl.

23. The method of claim 8, wherein the second eluate comprises less than 50 mM of the salt.

24. The method of claim 23, wherein the second eluate comprises less than 10 mM of the salt.

25. The method of claim 8, wherein the purified bispecific antibody is eluted and collected in the second eluate via the third wash buffer.

26. The method of claim 8, wherein the first pH is from 6 to 8.

27. The method of claim 8, wherein the second pH is from 4.0 to 4.25.

28. The method of claim 27, wherein the second pH is 4.10±0.05.

29. The method of claim 8, wherein the third pH is from 2.8 to 3.5.

30. The method of claim 8, wherein the fourth pH is from 6 to 8.

31. The method of claim 8, further comprising an additional chromatography step or viral inactivation step following step (h).

32. The method of claim 31, wherein the additional chromatography step or viral inactivation step is performed under conditions with less than 100 mM salt.

33. The method of claim 32, wherein the additional chromatography step includes ion exchange chromatography.

34. The method of claim 33, wherein the ion exchange chromatography is anion exchange chromatography and is performed under conditions with less than 50 mM salt.

* * * * *